United States Patent [19]

Firth et al.

[11] 4,131,925
[45] Dec. 26, 1978

[54] EDGE GUIDE FOR COOPERATION WITH A COAXIAL REEL CASSETTE

[75] Inventors: Ronald R. Firth, Fairport; Jerry R. Horak, Rochester, both of N.Y.

[73] Assignee: Eastman Kodak Company, Rochester, N.Y.

[21] Appl. No.: 821,113

[22] Filed: Aug. 2, 1977

[51] Int. Cl.² .................... G11B 23/04; G11B 15/60
[52] U.S. Cl. .................................. 360/130; 226/196; 242/76; 242/194
[58] Field of Search ............... 360/130, 132, 93, 95, 360/85; 226/196, 189; 242/76, 194, 55.19 A, 197–200

[56] References Cited

U.S. PATENT DOCUMENTS

| | | | |
|---|---|---|---|
| 2,706,638 | 4/1955 | Bruderlin et al. | 360/130 |
| 3,042,331 | 7/1962 | Bierman | 242/76 |
| 3,376,395 | 4/1968 | Rumple | 350/130 |
| 3,518,647 | 6/1970 | Altonji et al. | 360/130 |
| 3,843,035 | 10/1974 | Fitterer | 226/196 |
| 3,991,956 | 11/1976 | Machida | 226/196 |
| 4,017,897 | 4/1977 | Blanding | 360/130 |

*Primary Examiner*—Alfred H. Eddleman
*Attorney, Agent, or Firm*—Thomas H. Close

[57] ABSTRACT

An edge guide is provided for use in a narrow-track linear transport recorder. The guide forms a straight edge near a magnetic head for referencing the location of a magnetic tape with respect to the head. when a coaxial-reel tape cassette is inserted into the recorder, a pair of conical rollers provided in the cassette for use with the guide cooperatively urge an edge of the tape against the guide. The edge guide extends substantially the full distance between the rollers to minimize any tendency of the tape to buckle as it is urged against the guide. A tape drive engages the tape at a position outside of the span between the rollers to move the tape past the head without interfering with the cooperative action of the rollers and the edge guide. Thus, the critical edge guide requirements for narrow-track recording are met entirely outside of the mass-produced cassette.

5 Claims, 3 Drawing Figures

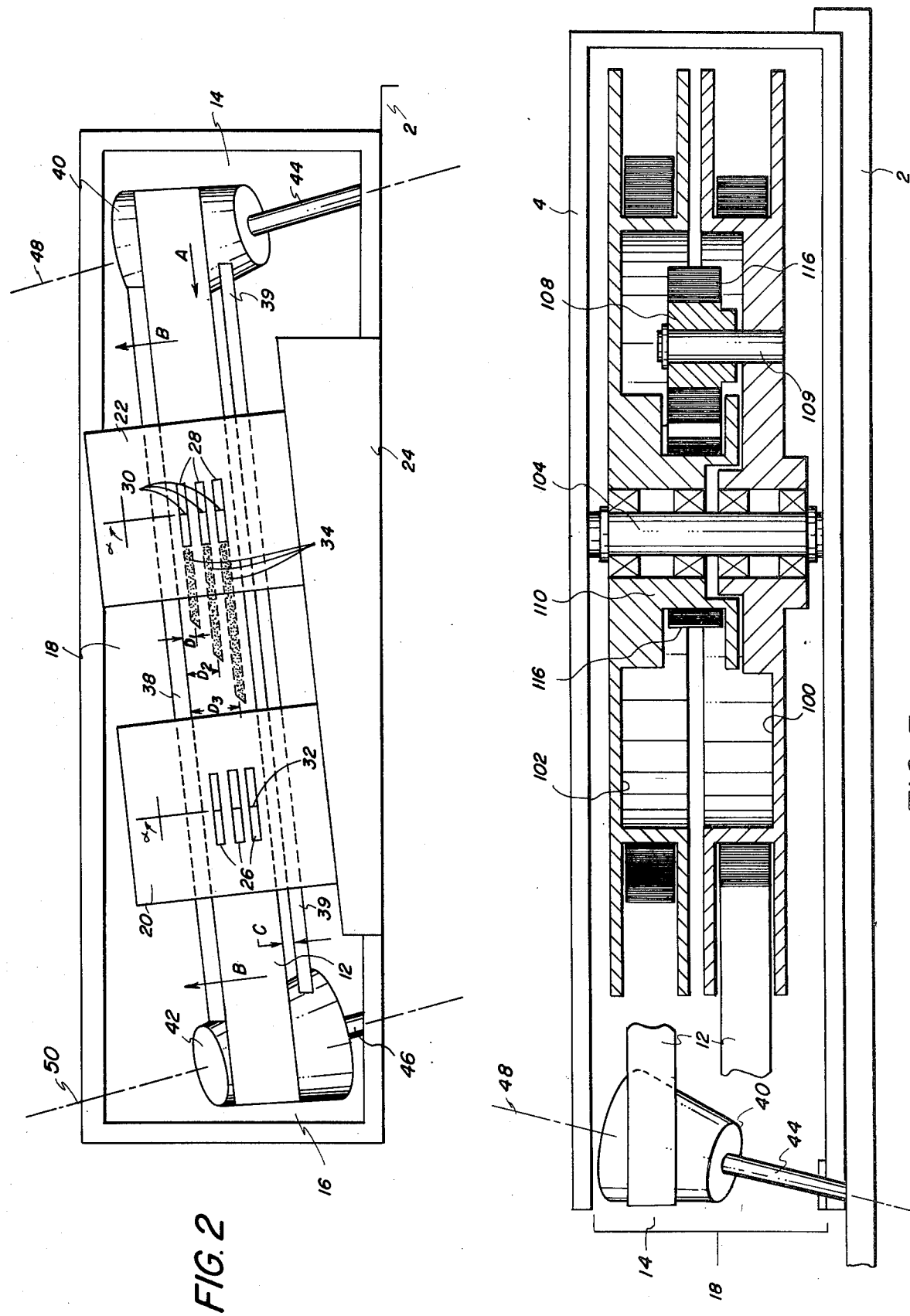

EDGE GUIDE FOR COOPERATION WITH A COAXIAL REEL CASSETTE

FIELD OF THE INVENTION

This invention relates in general to tape transport apparatus for precisely positioning and registering a magnetic tape with respect to one or more magnetic heads in a tape recorder; more particularly, the transport apparatus is designed to cooperate with a tape span extending between a pair of truncated conical tape roller guides that urge the tape firmly against the tape registering apparatus.

DESCRIPTION RELATIVE TO THE PRIOR ART

While it is not so restricted, the invention acquires particular significance when it is used in a recording apparatus that is disposed to receive a coaxial-reel tape cassette. Due to the problem of transporting tape between two levels in a cassette, special tape guides have been suggested for changing the direction and inclination of magnetic tape within a coaxial-reel cassette. In one commonly used form, these guides include rotatable truncated cones for guiding magnetic tape along an inclined path from the level of one coaxial reel to the level of the other coaxial reel. Since the tape tends to move transversely along each cone's surface, flanges are formed integrally with each cone to restrain the tape and prevent it from riding off the guide. Typically, the flanges are mounted so that the planes that they describe are perpendicular to the rotation axes of the guides; in other words, the flanges are normal, and not contoured, with respect to the axes of the conical surfaces.

The guides thus far described have edges which do not contribute significantly to changing the inclination of the tape path. Edges which do so contribute are illustrated by U.S. Pat. No. 4,017,897. In order to provide a guide having a guiding surface and a guiding edge which both significantly contribute to changing the direction and inclination of a magnetic tape, this patent discloses a rotatable tapered surface to guidedly alter the inclination and direction of the tape and a contoured stationary edge guide to guidedly control and support an edge of the magnetic tape as it changes direction and inclination around the rotatable conical surface. The contour is so disposed as to match the changing inclination of the tape during the full length of its wrap around the tapered surface. In one suggested form, the tapered surface is conical and the contoured edge forms a spiral path in a ledge adjacent one end of the conical surface.

Others skilled in this art have sought to benefit from the fact that tape rounding a non-cylindrical guide tends to move of its own accord either top-side or bottom-side with respect to the guide. Such a tendency is utilized by U.S. Pat. No. 2,706,638, which discloses guide rollers that act as cone pulleys due to their orientation. The cooperative action of a pair of such rollers causes a passing tape to "creep" to one edge of the rollers until restrained by an appropriate stop, such as a flange on the roller. When the drive is reversed, the tape "creeps" to the opposite edge until restrained by an opposing stop. This tendency is used to orient separate sound tracks with a magnetic head in correspondence with forward or reverse tape motion.

A guide having an overall barrel shape will urge tape passing thereover toward its largest diameter portion at its center. As illustrated in U.S. Pat. No. 3,376,395, such barrel-shape guides lead a magnetic tape toward and away from a confined oblique path around a helical recording drum. Confined between parallel edge guides around the drum, the tape bears against one edge guide when it enters the oblique path, then changes course and bears against the opposite edge guide as it leaves the confined path. By allowing an adjustment of the confining edge guides so as to vary their separation and the width of the tape path, the moving tape will assume different angular relationships with respect to the moving head. This feature is useful in providing for single frame playback.

Turning now to another problem with cassette recording, the head tracks, which are laid down in a particular manner, must be precisely re-traced during playback. In a linear transport apparatus, the tracks are laid down linearly with the direction of tape movement. On playback, the heads obviously must follow the same linear path. Not only must the same track be followed, but the angle of the playback head gap with respect to the direction of the track — normally a right angle — must exactly duplicate the recording angle, or azimuth error will result. In prior linear transports, this problem was complicated by requiring mass produced cassettes to be designed with sufficient tolerance to deliver the tape to the head with all these considerations in mind. As it turns out, precision control of guiding in such a cassette is difficult to achieve because it must be mass-manufactured with inexpensive components. The problem is compounded when multiple tracks are recorded on the tape and/or narrow track recording is suggested.

SUMMARY OF THE INVENTION

Web guides are commonly thought of as isolated structures for confining and directing a travelling span of web material. The present invention recognizes that a web guide can perform the additional function of a precision reference if it is considered a cooperative element that interacts with forces imposed for that purpose on a moving tape. Therefore the invention postulates web guiding means in a coaxial reel cassette for imposing a lateral movement on a span of moving tape and reference guiding means cooperative therewith on a recording apparatus for intercepting the laterally moving tape such that the tape is precisely positioned with respect to one or more magnetic heads. In practice, the web guiding means in the cassette for urging the tape sideways include a pair of oppositely-disposed tapered rollers, one mounted at the level of a supply reel mounted for rotation in the cassette and the other mounted at the level of a take-up reel mounted for rotation in the cassette. A span of web material extends between the rollers and therefrom to each of the reels. In the cassette, a window exposes the span of web material to apparatus on the deck of the recording machine. Included in the recording machine is web transport apparatus having reference guiding means disposed in the path of the span of web material extending across the window. The reference guiding means extends substantially the full distance between the rollers to minimize any tendency of the web to buckle as it is urged, by the rollers, against the reference guiding means. The web transport apparatus further includes a web drive that engages the web at a position outside of the span between the rollers so as to move the web past the heads without interfering with the cooperative action of the rollers and the reference guiding means.

In a presently preferred embodiment the reference guiding means is comprised of a straight edge guide serving to position an edge of the tape precisely with respect to one or more nearby magnetic heads. In a further refinement, the reference edge guide may be formed as an integral structure with the head supporting bracket. When the tape is transported from reel to reel, the tapered guides in the cassette are so disposed that they cooperatively urge the tape in a lateral direction transverse to the direction of transport. By positioning the straight edge guide in the direction of urging of the tape, the edge of the tape will be intercepted in its transverse movement and firmly and precisely positioned with respect to the magnetic heads.

What the invention accomplishes is to remove the precision guiding of the moving tape from the control of the mass-produced cassette. Instead, the tape is precisely referenced against the head, time after time, by a carefully manufactured precision edge guide associated with the head itself. Furthermore, to complement the inherent tendency of the tape to be urged in a given direction, the invention utilizes additional urging means in the cassette for firmly urging the edge of the tape against the external edge guide.

BRIEF DESCRIPTION OF THE DRAWING

The invention will be described with reference to the figures, wherein:

FIG. 2 is an elevation view of the rotatable guides in the cassette and the straight edge guide mounted with reference to the heads in FIG. 1 and taken along line 2'—2'; and FIG. 3 is an elevation view of one rotatable guide and its associated cassette reel mechanism and taken along line 3'—3' in FIG. 1.

DESCRIPTION OF THE PREFERRED EMBODIMENTS

Figure 1:
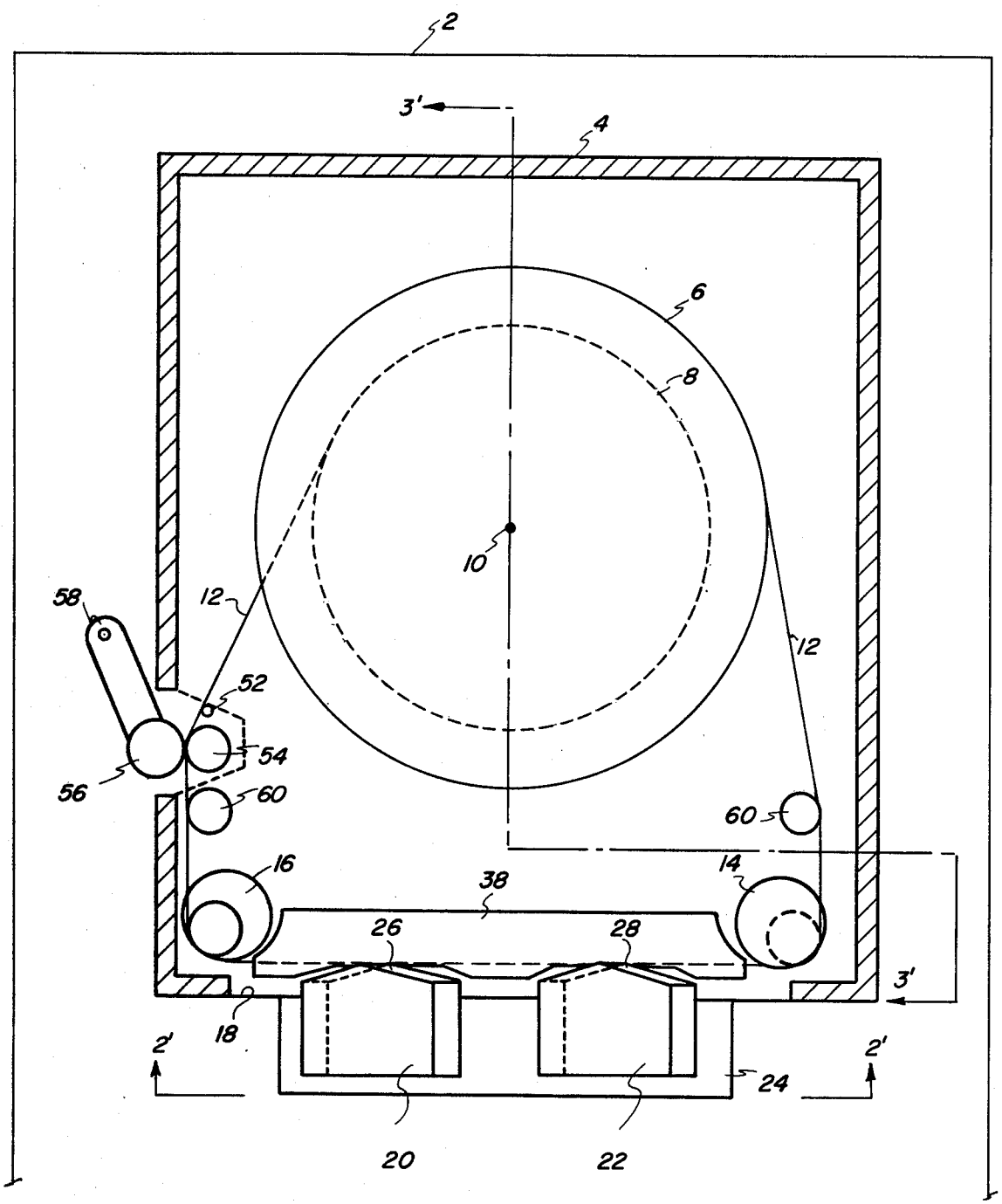
FIG. 1 is a top view of a portion of a tape recorder and a coaxial-reel cassette incorporating a presently preferred embodiment of the invention.

Because magnetic tape recorders are well known, the present description will be directed in particular to elements forming part of, or cooperating more directly with, the present invention. Recorder elements not specifically shown or described herein may be selected from those known in the art.

Referring specifically to FIG. 1, there are shown the parts of a magnetic tape recorder which are sufficient for an understanding of the present invention. A tape recorder 2 is provided with space on its playing deck for accepting a coaxial-reel cassette 4. A supply reel 6 and a takeup reel 8 are coaxially disposed with relation to each other and supported for rotation within the cassette 4 about an axis 10. A magnetic tape 12 leaves the supply reel 6 and passes across guides 14 and 16 during the course of its travel to the takeup reel 8.

The cassette 4 has a cutaway front face 18, hereinafter sometimes referred to as a window, which is so designed as to permit the positioning of a pair of magnetic recording heads 20 and 22 adjacent the tape 12. The heads 20 and 22 are rigidly mounted on an inclined base plate 24 attached to the tape recorder 2. As best seen in FIG. 2, each magnetic head unit 20 and 22 includes track-defining face parts 26 and 28, respectively, for magnetically cooperating with the surface of the tape 12. The head 22 forms the recording head of the apparatus while the head 20 forms the playback head, although the functions of the heads could be interchanged without affecting the invention. When the tape 12 is moved past the face parts 28 in a direction shown by the arrow A, (see FIG. 2) head gaps 30 formed therein trace a set of data tracks 34 on the moving tape 12. While three track-defining recording heads are shown, it is understood that this is for illustration only; more heads or as few as one may be provided. The playback function is separate from record in the present embodiment, narrow gaps 32 being provided — specifically for playback — in the face parts 26.

The base 24 is so inclined on the deck of the recorder 2 that the head gaps 30 and 32 of the heads mounted thereon maintain a predetermined angle $\alpha$ with the direction of the movement of the tape 12. Usually, but not always, the angle $\alpha$ is a right angle; the important requirement is that the angle $\alpha$ be substantially the same on playback as on record. A deviation from this common orientation is called azimuth error and leads to undesirable effects in the reproduced signal. Furthermore, with multiple track recording as illustrated here, an error in the angle $\alpha$ causes a width-wise timing error across the tape and between tracks on playback. In addition to these angular errors, the tape 12 on playback must be exactly repositioned with respect to the head 20 just as it was positioned on record; otherwise the gaps 32 may not correctly align with the data tracks 34. Indeed, the data tracks may in practice be as narrow as 10 mils or less and a minute misalignment may cause the pole face parts and their associated gaps to slip into the adjacent guard band and entirely miss the desired data tracks. This problem is compounded since the tracks 34 are replayed while the tape is changing levels between the supply and takeup reel. The slightest distortion in tape movement at this point correspondingly degrades the reproduced signal.

The invention alleviates these problems by providing an edge guide 38 — shown in FIGS. 1 and 2 — which cooperates with specially designed guides 14 and 16 to precisely reference the tape location with respect to the head gaps 30 and 32. The guides 14 and 16 include conically-shaped rollers 40 and 42 supported in the cassette 4 on stationary posts 44 and 46 for rotation about axes 48 and 50, respectively. Both guides 14 and 16 are so canted in the cassette that tape passing between them in the direction shown by the arrow A is urged in a direction shown by the arrows B. The function of the edge guide 38 then is to intercept the transversely urged tape 12 and support it in a precise relationship with the head gaps 30 and 32. Such cooperation has been found to precisely replicate time and again the distances $D_1$, $D_2$ and $D_3$ corresponding to the centering of the head gaps 30 and 32 over the set of data tracks 34. Since the guide 38 is attached to the recording apparatus at the heads, it may be carefully machined to close tolerance without concern for the exigencies of mass-production, which will dominate the design of cassette 4 and its internal components.

The guides 14 and 16 provide the preferential force to drive the tape laterally in the direction described by the arrows B. It has been observed that the lateral force thus imposed on the tape 12 depends both on the tension of the tape and the coefficient of friction between the tape 12 and the conical rollers 40 and 42 — the greater the coefficient the greater the imposed lateral force. The edge guide 38 is preferably a straight edge extending substantially across the window 18 such that one end is located near the exit of the tape 12 from the tapered roller 40 and the opposite end is located near the entrance of the tape 12 onto the tapered roller 42. This provision minimizes any tendency of the tape — depending upon its elastic properties — to buckle as it crosses the heads. An additional edge guide 39 is also provided adjacent the edge of the tape opposite to that being referenced to the heads. With the tape moving in the direction A and the imposed forces moving the tape against edge guide 38, as shown in FIG. 2, the tape will maintain a constant distance C away from the edge guide 39. The purpose of the edge guide 39 is to furnish an edge for the tape to ride against when it is being rewound upon the supply reel 6 in a direction counter to the arrow A.

Referring again to FIG. 1, a cut-out 52 is provided in the side and bottom of the cassette 4 for receiving a tape driving mechanism mounted on the recorder 2. By so mounting the driving mechanism outside of the span of tape between guide rollers 14 and 16, the driving mechanism moves the tape past the heads without interfering with the cooperative action of the guide rollers 14 and 16 and the edge guide 38. Such mechanism may typically comprise a capstan 54 and a pinch roller 56 mounted on a bracket for movement about an axis 58. The capstan is adapted to move into the cassette 4 through the cut-out 52. In operation, the pinch roller 56 is rotated about the axis 58 until it engages the capstan 54 with the tape 12 squeezed therebetween. When the capstan 54 begins to rotate, the tape 12 is frictionally advanced from the supply reel 6 to the take-up reel 8. Auxiliary guides 60 aid in wrapping the tape 12 around the capstan 54 and in guiding the tape to and from the reels.

A presently preferred embodiment of the invention is used with a constant torque motor or negator type spring interdrive between the supply and takeup reels. The negator — as described in U.S. Pat. No. 2,996,264 — is a tight spiral spring of thin ribbon-like metal which tends to recoil itself with constant torque when unwound. The negator spring is in a wound (pretensioned) state at the beginning of the recording cycle and causes the takeup reel to rotate a predetermined number of turns relative to the rotation of the supply reel during a complete cycle. This predetermined number of turns is about equal to the additional turns that the takeup reel must rotate, compared to the rotation of the supply reel, to wind upon itself one-half the total length of tape initially on the supply reel. During this interval, the rate at which the tape passes the transducer or recording head is regulated by the constant speed characteristic of the capstan drive although minimal capstan power is required to transport the tape. After one-half the tape has been wound on the takeup reel and winding proceeds further, the negator spring reverses itself and begins to unwind to its beginning (pretensioned) position. Now the supply reel rotates a predetermined number of additional turns relative to the rotation of the takeup reel as the remainder of the tape is wound up. Consequently, the interdrive between the two reels functions to rotate both reels in the same direction but at different rates while substantially constant tension, depending on the radius of the tape roll, is maintained throughout the tape path.

Referring now to FIG. 3, the invention is shown in use with a coaxial-reel cassette having a negator spring interdrive. Two tape reels 100 and 102 are shown rotatably mounted on a shaft 104 in the cassette body 4. The reel 102 serves as the supply reel 6 of FIG. 1 for the tape system while the reel 100 serves as the takeup reel 8 of FIG. 1. A spring drum 108 is rotatably attached to the takeup reel 100 by means of a shaft 109. A spring motor hub 110 is integrally formed with the supply reel 102 for rotation therewith around the shaft 104. The negator spring interdrive is completed by a spring 116 which is wrapped at one end around the hub 110 and at the other end around the drum 108.

The magnetic tape 12 extends from the stack on the supply reel 102 past the cassette guide 14 and across the window 18 in the cassette 4 for further cooperation with the mechanism of a tape recorder, partially shown by the deck 2. The tape is then returned to the takeup reel 100 by way of the cassette guide 16 (as best shown by FIG. 1). Not shown here are other miscellaneous guides (such as guides 60 in FIG. 1), unimportant to the teaching of this invention, which assist in transporting the tape to the takeup reel 100. A capstan (not shown in FIG. 3) pulls the tape off the supply reel 102 and causes the reel to rotate. Rotation of the supply reel 102 causes the hub 110 to rotate and to transmit torque through the spring 116 to the spring drum 108 which, in turn, drives the takeup reel 100 to take up the tape from the capstan. Since the operation of a negator spring interdrive is described in the aforementioned U.S. Pat. No. 2,996,264, the foregoing explanation is made only to the extent necessary to describe the invention.

The negator spring interdrive is shown by way of illustrating a preferable constant torque tape transport system useful with the invention. Each reel is then rotated sufficiently to maintain a constant tape tension. However, the edge guiding system of the invention will operate with other forms of tape transport. For example, the reels 100 and 102 may be provided with hubs having coaxial gearing that mates with coaxial drive gears on the recorder 2 and are directly driven therefrom. Furthermore the exact geometrical shape of the guides 14 and 16 does not have to be precisely conical; any particular combination of tapered guide and canted axis will be sufficient if the cooperative effect of the guides is to urge the tape against the edge guide 38 along its full length thereof. Finally, cylindrical rollers, if obliquely inclined in the cassette, will act like tapered rollers to the extent of forcing the tape sideways in its travel across the window.

The invention has been described in detail with particular reference to preferred embodiments thereof, but it will be understood that variations and modifications can be effected within the spirit and scope of the invention.

What is claimed is:

1. Web transport apparatus forming part of a narrow-track, linear-transport, magnetic recording device and cooperative with a coaxial-reel cassette of the type useful with a magnetic recording device, the cassette having supply and takeup reels mounted at separate levels, the reels having a span of web material extending therebetween, the cassette having a window across which the web is adapted to extend and associate with a magnetic head mounted on the recording device, the cassette further having:
   a. a first tapered guide roller mounted within the cassette for guiding the web across the roller surface thereof from the level of the supply reel to a path across the window, said first tapered guide roller being mounted so as to urge the web in a first direction generally in the direction of the width of the tape in response to the web being advanced along said path; and b. a second tapered guide roller mounted within the cassette for guiding the web across the roller guide surface thereof from said path across the window to the level of the takeup reel, said second guide roller being mounted so as to urge the web in said first direction in response to the web being advanced along said path, said web transport apparatus comprising:

A. edge guiding means mounted on the recording device adjacent the head and extending substantially the full distance between said first and second guide rollers, said edge guiding means cooperating with said first and second tapered guide rollers for guiding a length of the web along an edge thereof past the head and from the level of the supply reel to the level of the takeup reel, said edge of the web being biased against said edge guiding means by the cooperative urging tendency of said first and second tapered guide rollers; and B. web drive means disposed to engage the web at a position outside of the span of web material extending between said first and second tapered guide rollers for advancing the web along said path without interfering with the cooperative action of said first and second tapered guide rollers and said edge guide means, thereby providing the critical edge guide requirements for a narrow-track, linear-transport magnetic recording device outside of the cassette.

2. Tape transport apparatus provided on a narrow-track, linear-transport, magnetic tape recorder of the type that employs a tape cassette having a supply reel at one level and a takeup reel at another level in the cassette, the cassette further having a window and inclined guide members at opposite sides thereof for directing a span of tape between the separate levels and across the window, the inclined guide members further being so mounted in the cassette as to jointly urge the moving tape in a predetermined direction generally transverse to the direction of the moving tape, the recorder including a magnetic head having a track-defining face part for associating with the moving tape, the tape transport apparatus comprising:

tape edge guiding means mounted on the recorder adjacent said face part for defining a reference distance between an edge of the moving tape and said track-defining face part, said tape edge guiding means extending substantially the full distance between said inclined guide members;

means for positioning said track-defining face part and said associated edge guiding means adjacent the moving tape in the window of the cassette for arresting the tape along an edge thereof from further urging in the predetermined generally transverse direction, thereby to reference an edge of the tape with respect to said track-defining face part; and tape drive means disposed to engage the tape at a position outside of the span between the inclined guide members for moving the tape past said face part without interfering with the edge referencing action of said inclined guide members and said tape edge guiding means, thereby providing the critical edge guide requirements for a narrow-track, linear-transport, magnetic recording device without the need for higher tolerance parts in the cassette.

3. In a narrow-track, linear-transport tape recording apparatus for use with a coaxial reel cassette, the cassette having oppositely disposed tapered guide rollers for guiding the tape between the separate levels of the cassette, the cassette further having a window therein for exposing a span of tape to a magnetic head on the recorder, and means for mounting the tapered guide rollers at oblique angles with respect to the axis of the reels for imposing a lateral force on the moving tape causing a lateral movement of the tape as it travels across the window; the apparatus including a tape guide for orienting the tape with respect to the magnetic head, and tape drive means for moving the tape past the magnetic head, the improvement comprising:

(a) the tape guide having edge guiding means structurally associated with the magnetic head and mounted on said recording apparatus so as to project through the window into the path of the lateral movement of the tape for intercepting the laterally moving tape and restraining the tape along an edge thereof in a precise relationship with the head, said edge guiding means extending substantially the full distance between the tapered guide rollers; and (b) the tape drive means having means for engaging the tape at a position outside of the span of tape between the tapered guide rollers for moving the tape past the magnetic head without interfering with the cooperative action of the tapered guide rollers and the edge guiding means, thereby providing the critical edge guide requirements for a narrow-track, linear-transport tape recording apparatus without the need for high tolerance parts in the cassette.

4. Improved tape transport apparatus for use in the type of narrow-track, linear-transport magnetic recording device that utilizes a coaxial-reel cassette, the cassette including a window on a side thereof for exposing a span of tape to a magnetic head on the recording device, the recording device including a tape drive and a tape edge guide near the head adapted to extend through said window for positioning the moving tape with respect to the magnetic head, the cassette further including, guiding means including a pair of rotatable, truncated conical guide rollers situated on opposite sides of the window with their apexes in opposed relationship for guidedly orienting the span of tape between the separate levels of the reels in the cassette and through an exposed path across the window defined therein, and means mounting the axes of said conical guide rollers obliquely in the cassette with respect to the common axis of the reels for causing the tape to move laterally of said exposed path across the window, in response to movement of the tape along said path, until restrained by the edge guide located near the magnetic head, thereby to position the moving tape with respect to the magnetic head, wherein the improvement comprises:

(a) said edge guide extending substantially the full distance between said conical guide rollers; and (b) said tape drive means having means for engaging the tape at a position outside of the span of tape between said rollers for moving the tape past the head without interfering with the lateral movement of the tape across the window, thereby providing accurate edge guiding of the tape with respect to the head in such narrow-track, linear-transport, magnetic recording device without the need for high tolerance parts in the cassette.

5. In combination with a narrow-track, linear-transport magnetic tape player and a coaxial reel cassette having supply and takeup reels mounted for rotation at separate levels in the cassette, the cassette further having a window with a span of tape extending thereacross for exposure to a magnetic head mounted on the player, tape transport apparatus comprising:

a pair of tapered guide rollers carried by the cassette and situated in the path of the tape on opposite sides of the window for guidedly inclining the tape between the separate levels in the cassette and across the window, an edge guide, carried by the player, adjacent the head and substantially abutting the span of tape through the window for guiding the tape along an edge thereof during its contact with the magnetic head, the edge guide extending substantially the full distance between said tapered guide rollers;

means so orienting said tapered guide rollers in the cassette that the span of tape is cooperatively urged by said tapered guide rollers against said edge guide throughout the length of contact therewith in response to movement of the tape past the window; and tape drive means disposed to engage the tape at a position outside of the span of tape between said tapered guide rollers for moving the tape past the window without interfering with the cooperative action of said tapered guide rollers and said edge guide, thereby providing accurate alignment of the tape with respect to the magnetic head in a narrow-track, linear-transport, magnetic tape player without the need for high tolerance parts in the cassette.

* * * * *